United States Patent [19]

Howell

[11] Patent Number: 5,754,049

[45] Date of Patent: May 19, 1998

[54] METHOD AND APPARATUS FOR LOCATING BURIED CONDUCTORS IN THE PRESENCE OF PLURAL CONDUCTORS

[76] Inventor: Mark Ian Howell, 23 Windsor Court, Bristol,BS8 4LJ, England

[21] Appl. No.: 513,881

[22] PCT Filed: Feb. 17, 1994

[86] PCT No.: PCT/GB94/00322

§ 371 Date: Oct. 17, 1995

§ 102(e) Date: Oct. 17, 1995

[87] PCT Pub. No.: WO94/19708

PCT Pub. Date: Sep. 1, 1994

[30] Foreign Application Priority Data

Feb. 17, 1993 [GB] United Kingdom .................. 9303184
Sep. 17, 1993 [GB] United Kingdom .................. 9319266

[51] Int. Cl.⁶ ........................ G01V 3/11; G01V 3/165; G01R 19/00; H04B 1/02
[52] U.S. Cl. .......................................... 324/326; 324/67
[58] Field of Search .......................... 324/66, 67, 326, 324/327, 328, 329, 232, 239, 243; 343/879, 893

[56] References Cited

U.S. PATENT DOCUMENTS 5,361,029  11/1994  Rider et al. .......................... 324/67

Primary Examiner—Walter E. Snow
Attorney, Agent, or Firm—Larson & Taylor

[57] ABSTRACT

Buried conductors generally carry multi-frequency AC currents and are locatable by sensing the resulting varying magnetic flux. However the presence of several buried conductors makes location of individual conductors difficult. By investigating induced signals at a multiplicity of different frequencies it is possible to identify a frequency carried exclusively by a single conductor and use it to locate that conductor. E.g. an antenna array including three vertically spaced horizontal coils (A,B,C) is located over an apparent conductor position using vertical coils (D,E). For numerous frequencies, the terms $SB/(A-B)$, $2SC/(A-C)$ and $2S(B-C)/[(A-B)-(B-C)]$ are determined (where S=coil spacing; X=signal strength of coil X). For an exclusive frequency the three values are identical and equal to the depth of the conductor.

15 Claims, 2 Drawing Sheets

FIG. 1
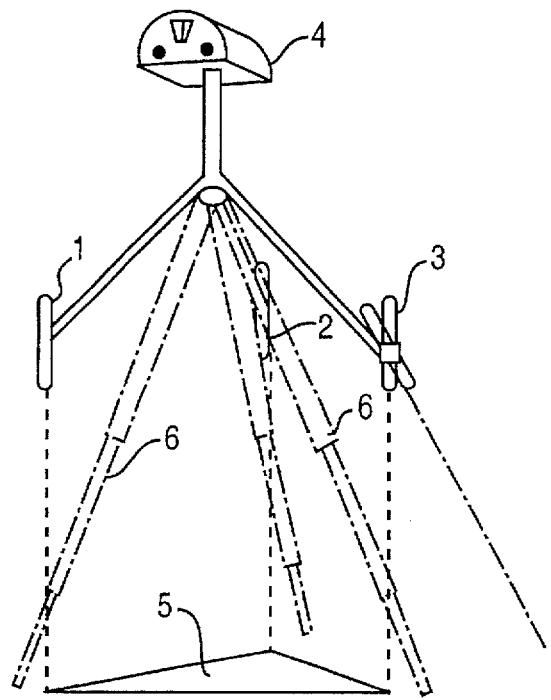
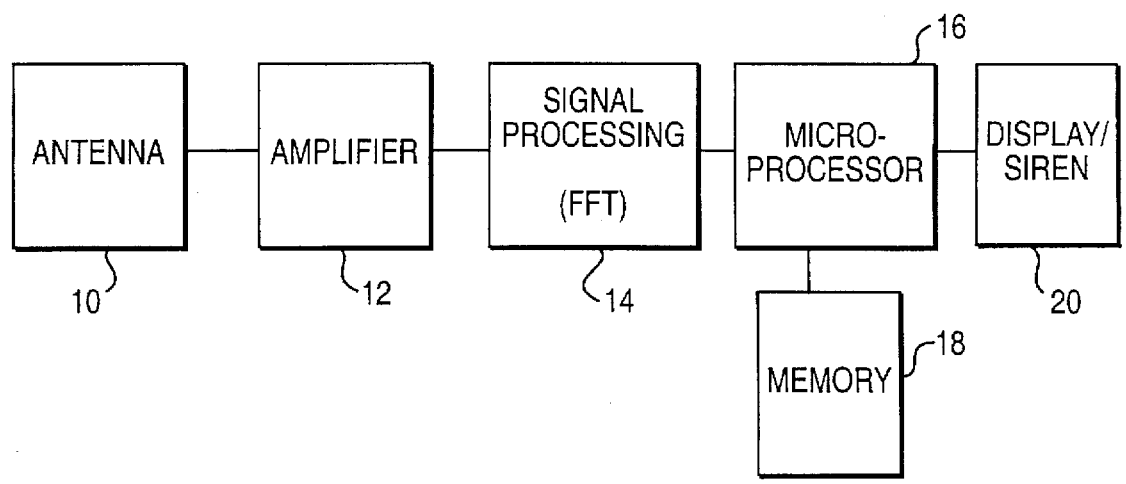
FIG. 2

METHOD AND APPARATUS FOR LOCATING BURIED CONDUCTORS IN THE PRESENCE OF PLURAL CONDUCTORS

TECHNICAL FIELD

The present invention relates to apparatus for, and a method of, locating buried conductors or other sources of varying magnetic flux. It is particularly concerned with finding buried long conductors where there may be several close together.

BACKGROUND ART

It is known that long metal lines buried in the ground (pipes and cables) are cut by alternating magnetic fluxes, from various sources, and that electric currents consequently flow in them. It is also known that their positions may be found by detecting where general, uniformly-distributed fluxes (originating from distant sources) are disturbed by the conductors' nearby subsequent fluxes, and may easily be distinguished from them by antenna arrangements that are only sensitive to local flux variation. But where there are several local sources of flux these arrangements eliminate only the general flux and respond to the sum of the local fluxes.

Known systems make use of the fact that the signal output of a coil in response to the currents flowing in a nearby long, straight conductor is proportional to the reciprocal of the distance between the closest points on their axes, and the cosine of the angle between their axes. Thus the sign, or phase, of the induced flux changes as that angle changes between <90 to >90 degrees.

All reported existing systems except that of GB-A-1,509,380 need the detecting instrument to be traversed (i.e. moved from one side of the conductor to the other) so it can find a maximum (or minimum) resultant flux intensity to determine a conductor's position. This may be measured at a single frequency using a tuned receiver, or at many frequencies using a "wide-band" receiver. That is; the detector's operator decides the position of maximum (or, with coils of vertical axis, minimum) received energy. With either horizontally or vertically oriented coil axes, the instrument detects the coils' rapidly alternating voltage amplitude levels, over very many cycles, varying as they traverse regions of changing alternating magnetic flux. These are then rectified to drive a DC component through a meter or sound-producing transducer.

GB-A-1,509,380 discloses the detection of buried conductors by means of an array of three (or more) vertically extending aerial coils whose axes define the corners of a polygon on the ground. A buried conductor carrying an alternating current induces signals in the coils some of which are of different phases if the conductor is beneath the polygon. FIG. 1 shows such an apparatus, having a yes/no meter 4 for indicating coil phase differences coupled to three coil aerials 1, 2, 3 mounted vertically to define a triangle 5 by means of a support structure having telescopic legs.

It is also known that where two buried conductors carrying currents of similar spectral content lie near to each other, their combined fluxes somewhat resemble that of a single conductor lying between them. Thus a false result is shown by an existing type of instrument using either a vertically or horizontally oriented axis coil array.

DISCLOSURE OF THE INVENTION

I have now appreciated that it will generally be the case that each conductor carries spectral components that are dissimilar to those of the others, and that tuning to those discrete components will enable a detector to discriminate between the two conductors.

But such disparate spectral components may be very small in amplitude compared with other components common to both conductors, so seeking to discriminate them using wide-band detectors may fail. Use of narrow-band detectors may also fail, since the different frequencies of the currents will not be known.

Usually, a buried elongate conductor is subject to alternating magnetic fluxes of many frequencies along its length. A plurality of conductors are unlikely to be uniformly oriented throughout their lengths. Thus they will not pick up signals of equal amplitudes and frequencies from the widespread sources of radio and other energies; nor will they always pass equally closely to local sources of alternating flux such as electrical machinery; nor will they be equally coupled capacitively, inductively, resistively and electrolytically to the ground and to other buried conductors. So they will each form a unique electro-magnetic circuit, and possess certain unique electro-magnetic properties. These properties will result in the conductors being differently susceptible to the passage along them of electric currents of particular frequency whether these currents result from "independently-occurring" fluxes or from deliberately-occasioned currents designed to lead to the conductors' detection and the plotting of their positions.

Since capacitive and/or inductive and/or electrolytic couplings must exist between a conductor and its surroundings, the current spectrum it acquires will be characteristic of its circumstances.

Through the influences mentioned above, the likelihood that any two conductors will carry an identical current frequency spectrum is remote. If it is accepted that no two long conductors will carry an exactly identical current spectrum, it follows that any conductor will contain unique spectral elements (possibly of very low amplitude).

According to the present invention in a first aspect there is provided a method of locating a conductor in a region suspected of containing a plurality of conductors all carrying respective alternating currents, comprising employing an antenna to derive an electrical signal in response to changing magnetic flux due to one or more of said conductors, and analysing the signal to determine data related to the apparent position of one or more of said conductors; said signal analysis comprising performing (sequentially or simultaneously) a multiplicity of like analytical steps each applied to a respective different frequency or frequency band; and comparing the results for the different frequencies or bands to assess the validity of the data. The antenna may comprise at least two vertically extending receiver coils whose axes intersect the ground at spaced points so that if the axes of two such coils are on different sides of the apparent position of a conductor, an alternating current in said conductor induces signals of opposite phase in the two coils, so that the presence of out of phase signals is indicative of the position of the conductor; and/or at least two receiver coils whose axes extend horizontally at different vertical heights so that if the coils are located above a conductor, whose axis is in a vertical plane which intersects the coils' axes then an alternating current in said conductor induces signals in each of the receiver coils where strengths are dependant on the distance of the respective coil from the conductor, so that comparison of the signal strengths of different ones of said coils enables the distance of the conductor to be related to the mutual spacing of said coils.

An antenna's associated amplifying circuitry may be caused to be narrowly tuned rapidly to various portions of the spectrum. The narrowness of the bandwidth of sensitivity to each frequency which can be attained is dependent on the length of time to which it can be subjected to scrutiny. At low frequencies appropriately long periods are needed to determine whether a current component exists at a particular frequency; at higher frequencies proportionately shorter periods.

The frequencies to be monitored may either be selected at, for example, octave or part-octave intervals from an arbitrarily-selected base or datum frequency, or they may be chosen from the flux spectrum existing at the particular locality of observation, probably in either case within the range of 50 Hz to 1.5 MHz.

Whether arbitrarily or empirically selected, each frequency in the spectrum may be examined to determine whether two or more responses unique to a conductor exist for any position over the ground.

Various techniques exist whereby an electromagnetic transducer or transducers can be used to determine the apparent location of a buried conductor, usually based on the assumption that the received field originates from a single conductor.

If any of these techniques is used together with the frequency spectrum sweeping concept, it will be seen that the result will be a series of apparent locations for each component of the frequency spectrum.

A three-coil vertical axis (3V) array as described in GB-A-1 509 380 has the advantage that any frequency component originating from only one long conductor source will give rise to an opposed-phase response for an antenna position above, and only above, that conductor (a "true" response): and it is capable of doing do so in response to a single cycle of flux energy. However, in order selectively to examine the elements of a complex current spectrum it is necessary to "tune" to each spectrum element, or nearly exact frequency, which requires, sampling the signal over a period of a number of cycles.

Also, the array will react to the combined fluxes of several conductors carrying common frequencies and show a "displaced" position of opposed-phase—a "false" indication—to those combined fluxes.

The 3V configuration outlined above presents a special opportunity to examine the ambient flux spectrum in detail, since it can do so from a spatial standpoint: at a given geographical position it can decide which spectral components give an anti-phase response. Some of these may result from frequencies of alternating current common to several conductors, some from frequencies existing on only one conductor. So, at any position over the ground there may be two classes of spectral component that will give rise to an opposed-phase response:

1. Those common to two or more conductors (false)
2. Those unique to a conductor (true)

This "either/or" ability of the 3V array to decide at any position whether an opposed-phase response at a particular frequency exists makes its output especially suitable for computer processing.

The method of the invention may be employed to determine a set of apparent locations of conductors. These may then be plotted as if a cross-section through the ground. The result is a plot showing many false locations scattered almost randomly throughout the ground. But, if the individual conductors carry several unique frequencies, there will also be a concentration of locations around that conductor's true position. By this means, true locations can be determined. One embodiment of this principle could be an instrument which is moved across the ground and provides a response which indicates—for each frequency—whether or not a conductor appears to be directly below.

These samples may be stored in a memory unit: each memory location consisting of a "yes" or "no" state for each frequency monitored for the position.

It will be understood that either a high or low "Q" bandwidth selection for the frequencies may be employed, depending on the complexity of the ambient spectrum and the multiplicity of the buried conductors.

It would be practicable for an instrument to be programmable for either high Q wide-band reception: requiring slow traversing or even successive, stationary readings to be taken, or high Q observation of comparatively high frequencies to be obtained at walking pace. Intermediate performances also could be selected. In any event, a memory store of the "yes/no" responses would be obtained for a multiplicity of frequencies at a particular location.

The 3V array is well qualified to perform detailed examination of the sources of local flux because it can show almost immediately that signals are being received in opposed-phase (signals either originating solely between the extended axes or from separate sources possibly both inside and outside the axes).

In the latter case, it may be assumed that such summed responses will alter in their position above the ground as the frequency of the flux examined is changed, whereas the fluxes originating only from a conductor situated between the axes will not. The sources of such flux may be incidental to the search for the conductor (radio and other electrical sources of alternating magnetic energy), or they may be deliberately applied to the sought conductor by a signal generator.

In either event it is practicable with the 3V array to examine the different frequencies of the flux spectrum because its output "decision" for each frequency inspected can be completed within a very short time.

Where several or many long current sources exist in close proximity, in conjunction with a complex alternating magnetic flux spectrum, the complex flux at the ground surface will contain components originating from one, two or many sources. Where a flux of particular frequency originates from only one source, the movement of the instrument such that the conductor no longer lies below the antenna will cause that response to change from "yes" to "no". Should this occur simultaneously at another frequency in the spectrum the probability is high that the source is beneath the array. Should more components similarly simultaneously change state the result would be almost certain.

An apparatus employing appropriate amplifying and frequency-filtering circuitry is proposed such that the input transducer(s) signal voltage(s) may be compared over a range of frequencies from approximately 50 Hz to perhaps 1.5 MHz, at a succession of ground positions.

As mentioned above, the frequencies to be monitored might be arbitrarily selected, but preferably they would be those of the flux spectrum existing in the locality of the instrument. Initially, the spectrum might be examined in great detail at high Q, say 100 to 1000, such that all significant portions of the local spectrum would be registered, and memorised. (Perhaps higher frequencies, for example from 20 kHz to 1 MHz, might be examined at higher Qs, since this will require shorter time periods to complete). Subsequently, the more prominent portions of the spectrum could be surveyed at successive positions along a survey traverse, and the positions and frequencies of "yes/no" responses entered in memory.

It will be understood that it would be practicable to monitor the spectrum at either low or high Qs and consequently the survey may demand "spot readings" at intervals along a traverse for high Q purposes, whereas lower Qs might permit survey at walking pace.

At any position, with a suitable transducer array, it is possible to determine whether a flux response unique to a particular conductor exists for any frequency the instrument is made sensitive to.

BRIEF DESCRIPTION OF DRAWINGS

FIG. 1 is FIG. 1 of GB-A-1,509,380 and shows an antenna assembly that may be employed in the present invention;

FIG. 2 is a block diagram of an embodiment of the present invention; and

MODES FOR CARRYING OUT THE INVENTION

Figure 3:
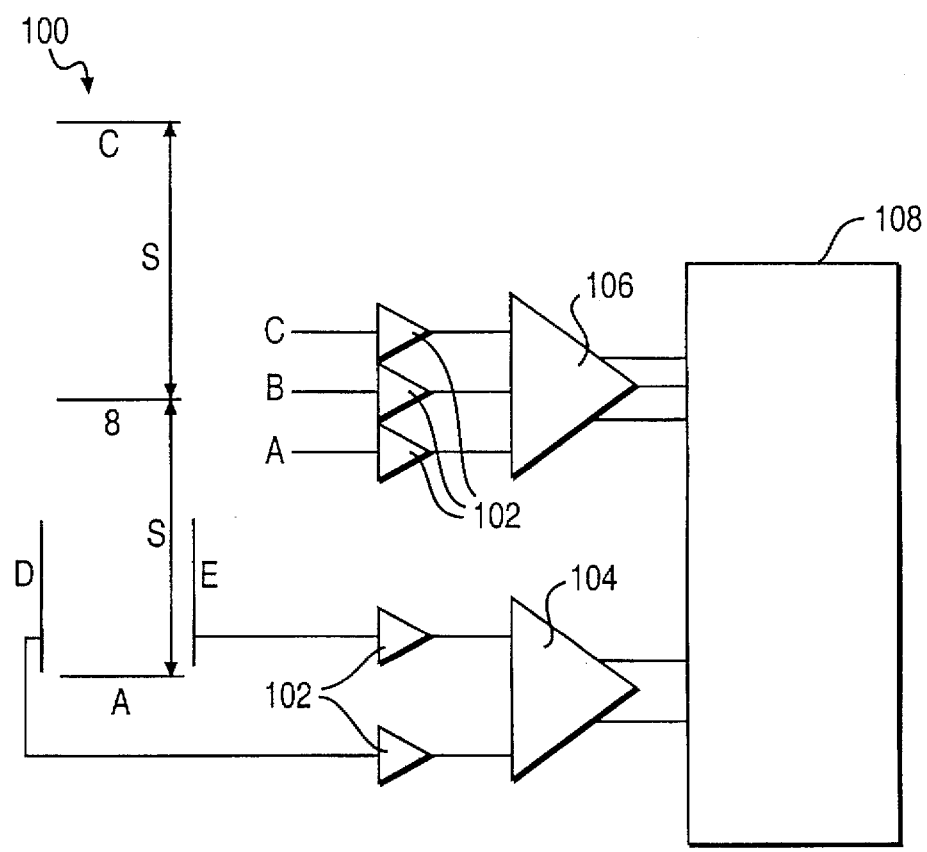
FIG. 3 is a block diagram of a second embodiment.

FIG. 1 shows a supporting tripod structure with telescopic legs 6 to facilitate levelling. It carries three identical coils 1, 2, 3 oriented with their axes in parallel (and generally arranged to be vertical). The axes define a triangle 5 where they meet the surface of the ground. The support structure also carries a housing 4 for signal processing circuitry, power means etc. For use in the present invention this includes a "frequency sweeping receiver" as shown in FIG. 2. Thus signals from the antenna 10 (in this case, the coils 1, 2, 3) are amplified-by an amplifier 12 and subjected to fast fourier transform analysis in an FFT analyser 14 under the control of a microprocessor 16 with an associated memory 18. An output may be displayed visually and/or aurally by means of a display/sounder 20 and/or stored in the memory 18 for subsequent evaluation.

The apparatus may be employed as follows.

At every position surveyed, an analysis is made of the local flux spectrum down from, say, 1.5 MHz to 0.05 kHz. (The microprocessor and memory may effect this automatically.) At a first position, A, surveyed, the "yes/no" response for each main frequency of the local flux is observed and stored in memory. At a second position, B, along a traverse, the process is repeated, and so on. The spacings may be equal to the spacings of the coils 1, 2, 3. Where a response is unique to a conductor at more than one frequency those frequencies will show a simultaneous change from in-phase, "no" to out-of-phase "yes" as the antenna is moved overhead the conductor responsible. Where the response is "yes" at two or more frequencies at a particular position it is unlikely that their simultaneous occlusion or appearance results from other than the existence of a conductor directly below, since the likelihood of equality of the influences of capacitance, inductance and electrolysis between sometimes adjacent buried long conductors at two discrete frequencies is extremely remote. Accordingly, the apparatus can be programmed to monitor the simultaneity of "occlusions" and "appearances" of responses as it is traversed. The greater the number of frequencies monitored, the greater is the certainty that the true position has been determined.

Where a current is applied to a conductor by a signal generator at a single frequency, capacitive, inductive and electrolytic links between buried conductors will remain constant, and such "displacement" of the observed response from the true position, where several conductors may be carrying the current, will also remain constant. Since capacitive and inductive influences will increase as the frequency is increased, and electrolytic influences are likely to decrease, applying two or more signal frequencies simultaneously will show that several conductors exist in the vicinity, through a multiplicity of "yes" positions along the ground traverse. Alternatively or additionally, the selection of applied signal frequencies to correspond with "unique" frequencies observed using the local spectrum may result in true applied signal responses occurring.

In respect of long conductors the 3V array shown in FIG. 1 is generally sensitive only to sources of flux originating within its extended axes and insensitive to flux gradients outside those axes. Thus it is not suitable for determining the distance to a conductor source, but only its plan position. It can be re-positioned such that, from its second position, by being reoriented, or tilted, it can find the distance to the conductor by "triangulation". However, this procedure may often be inconvenient in practice. But the 3V array could be beneficially partnered by a four-coil array as described in EP-B- 0119708. This has a first pair of crossed coils in a first horizontal plane, and a second pair of crossed coils in a second horizontal plane, the coils of the second pair being vertically spaced above respective coils of the first pair. The combined apparatus would be able to determine the distance (or depth) to a long conductor by measurement of the outputs of the four coils at a "true" out of phase response frequency or frequencies; revealing the distance or depth of the conductor. A preferred variant is shown in FIG. 3. This uses an antenna 100 with a single pair of horizontally spaced vertically extending coils D, E instead of the triple array of FIG. 1. They are in the same plane as three horizontally extending mutually parallel coils A,B,C, which are mounted with equal spacings. The coils are shown schematically by their axes. The signal $\underline{X}$ from each coil X is fed to a respective amplifier/buffer 102. Thence the vertical coil signals $\underline{D}$, $\underline{E}$ are passed to a first comparator 104, and the horizontal coil signals $\underline{A}$, $\underline{B}$, $\underline{C}$ are passed to a second comparator 106. The outputs are fed to a microprocessor 108.

When the antenna 100 is vertically over a horizontal conductor which extends into the plane of the paper between the centres of the horizontal coils A,B,C, then $\underline{D}=-\underline{E}$.

For an "exclusive" frequency (i.e. one carried by only one conductor): depth (distance of the conductor beneath the bottom coil)=$S\underline{B}/(\underline{A}-\underline{B})$ $2S\underline{C}/\underline{A}-\underline{C}$).

For a "non-exclusive" frequency, these relationships do not hold.

So immediately above an "exclusive frequency" flux source (if there IS one), there is an unequivocal state:

D+E=O, and $S\underline{B}/(\underline{A}-\underline{B})=2S\underline{C}/(\underline{A}-\underline{C})$=(correct) depth. A more accurate depth value is given by $$\text{depth} = \frac{2S(\underline{B}-\underline{C})}{(\underline{A}-\underline{B})-(\underline{B}-\underline{C})} \quad (1)$$

For a "non-exclusive" frequency:" depth≠S$\underline{B}$/(A-B); depth≠2SC/(A-C); and S$\underline{B}$/(A-B)≠2SC/(A-C). Thus it can be determined whether a particular frequency is exclusive or not.

If there is more than one "exclusive" frequency, their corresponding relations will be equal, i.e. for every "exclusive frequency", from $f_1$ to $f_n$: D+E=O, and the depth formulae give the correct depth.

The microprocessor is programmed to calculate depth, using formula (1). The vertical coils D,E are used to determine when the antenna is over a conductor, i.e. when $\underline{D}$= $\underline{E}$. The microprocessor may be arranged to carry out depth calculations automatically when the outputs of the first comparator 104 (namely $\underline{D}$–$\underline{E}$ and $\underline{E}$–$\underline{D}$) are zero.

I claim:

1. Apparatus for locating a conductor in a region suspected of containing a plurality of conductors all carrying respective alternating currents which differ in their current frequency spectra, said apparatus comprising an antenna for deriving an electrical signal in response to changing magnetic flux due to at least one of said conductors; signal processing means, coupled to said antenna, for analysing each respective frequency or frequency band of a multiplicity of different frequencies or frequency bands of said signal, for deriving, based on said analysing of each respective frequency or frequency band, respective data related to the apparent position of a conductor responsible for the particular respective frequency or frequency band and for comparing the respective data for the various frequencies or frequency bands to find coincidences which are taken as indicative that the frequencies or frequency bands are uniquely associated with individual conductors whose true positions correspond with the apparent positions corresponding to the data; and means for displaying the respective data or data resulting from further processing of the respective data.

2. Apparatus according to claim 1 wherein the antenna comprises bottom, middle and top horizontally extending coils (A,B,C) with a common spacing(S), the coils being identical; and the signal processing means includes means for calculating (i) $S\underline{B}/(\underline{A}-\underline{B})$ and (ii) $2S\underline{C}/(\underline{A}-\underline{C})$ where $\underline{A}$, $\underline{B}$ and $\underline{C}$ represent the signal strengths in coils A, B and C respectively; and means for comparing the values of terms (i) and (ii) and providing an indication when identify is found.

3. Apparatus according to claim 2 wherein the antenna also includes at least two vertically extending receiver coils whose axes intersect the ground at spaced points so that if the axes of two said coils are on different sides of the apparent position of a conductor, an alternating current in said conductor induces signals of opposite phase in the two coils, so that the presence of out of phase signals is indicative of the position of the conductor; and said signal processing means includes means for checking for out-of-phase signals in each of the multiplicity of frequencies or bands.

4. A method of locating a conductor in a region suspected of containing a plurality of conductors all carrying respective alternating currents which differ in their current frequency spectra, said method comprising the steps of employing an antenna to derive an electrical signal in response to changing magnetic flux due to one or more of said conductors; and analysing the signal to determine data related to the true or apparent position of one or more of said conductors; the analysing step comprising performing a multiplicity of like analytical steps each applied to a respective different frequency or frequency band, and each comprising deriving data relating to the apparent position of the conductor responsible for the particular frequency or frequency band, and comparing the data for the various frequencies or frequency bands to find coincidences which are taken as indicative that the frequencies or frequency bands are uniquely associated with individual conductors whose true positions correspond with the apparent positions corresponding to the data.

5. A method according to claim 4 wherein said frequencies or bands are selected from the range 50 Hz to 1.5 MHz.

6. A method according to claim 4 including a preliminary step of determining the frequency distribution of signals received by the antenna, and selecting the frequencies or frequency bands for the analytical steps to correspond to frequency regions of relatively high signal strength.

7. A method according to claim 4 wherein the antenna comprises at least two vertically extending receiver coils whose axes intersect the ground at spaced points so that if the axes of two such coils are on different sides of the apparent position of a conductor, an alternating current in said conductor induces signals of opposite phase in the two coils, so that the presence of out of phase signals is indicative of the position of the conductor; and said multiplicity of analytical steps comprises checking for out-of-phase signals in each of the multiplicity of frequencies or bands.

8. A method according to claim 4 wherein the antenna comprises at least two receiver coils whose axes extend horizontally at different vertical heights so that if the coils are located above a conductor whose axis is in a vertical plane which intersects the coils' axes, then an alternating current in said conductor induces signals in each of the receiver coils whose strengths are dependent on the distance of the respective coil from the conductor, so that comparison of the signal strengths of different ones of said coils enables the distance of the conductor to be related to the mutual spacing of said coils; and wherein said multiplicity of analytical steps comprises comparison of signal strengths of different ones of said coils at each of a multiplicity of frequencies or bands thereby to obtain a corresponding multiplicity of data indicative of the apparent distance of a conductor; and comparing the data to find coincident data.

9. A method according to claim 4 wherein the antenna comprises three horizontally extending coils which extend at different vertical heights so that signals in any two of the coils can be analysed to provide data related to the apparent distance of a conductor; and wherein such analysis is performed for two pairs of the coils for each of a multiplicity of said frequencies or bands and the results are compared to determine which of said frequencies or bands correspond to exclusive frequencies associated with only one conductor.

10. A method according to claim 9 wherein the antenna comprises bottom, middle and top horizontally extending coils (A,B,C) with a common spacing(S), the coils being identical; and the analysis involves comparison of (i) $S\underline{B}/(\underline{A}-\underline{B})$ with (ii) $2 S\underline{C}/(\underline{A}-\underline{C})$ where $\underline{A}$, $\underline{B}$ and $\underline{C}$ represent the signal strength in coils A, B and C respectively; identity of the terms (i) and (ii) indicating that the frequency or band is exclusive and that (i)=(ii)=depth of the conductor beneath the bottom coil (A).

11. A method according to claim 8, the antenna comprising both horizontally extending and vertically extending receiver coils.

12. A method according to claim 4 wherein said steps are performed sequentially.

13. A method according to claim 4 wherein said steps are performed simultaneously.

14. A method according to claim 4 wherein the antenna is moved across the region of interest and, at each of a multiplicity of test locations, a multiplicity of determinations are made for respective frequencies or bands as to whether the antenna is over an apparent conductor position; and resulting yes/no data are stored together with information about the test location where the yes/no data were determined.

15. An antenna having a support structure carrying three like horizontally extending parallel coils extending in a common vertical plane and spaced one above the other; and two like vertically extending horizontally spaced coils in the same plane as the horizontally extending coils.

* * * * *